US011596917B2

(12) United States Patent
Woods et al.

(10) Patent No.: US 11,596,917 B2
(45) Date of Patent: Mar. 7, 2023

(54) TEST SYSTEM WITH RECIRCULATING FLUID REACTOR

(71) Applicant: Catagen Limited, Belfast County (GB)

(72) Inventors: Andrew Woods, Belfast County (GB); Jonathan Stewart, Dromore County (GB); Richard O'Shaughnessy, Belfast County (GB); Rose Mary Stalker, Glenavy County (GB)

(73) Assignee: Catagen Limited, Belfast (GB)

( * ) Notice: Subject to any disclaimer, the term of this patent is extended or adjusted under 35 U.S.C. 154(b) by 789 days.

(21) Appl. No.: 16/332,637

(22) PCT Filed: Sep. 12, 2017

(86) PCT No.: PCT/EP2017/072946
§ 371 (c)(1),
(2) Date: Mar. 12, 2019

(87) PCT Pub. No.: WO2018/050661
PCT Pub. Date: Mar. 22, 2018

(65) Prior Publication Data
US 2020/0061570 A1    Feb. 27, 2020

(30) Foreign Application Priority Data

Sep. 13, 2016   (GB) ..................................... 1615561

(51) Int. Cl.
*B01J 19/00*     (2006.01)
*G06N 3/02*     (2006.01)
(52) U.S. Cl.
CPC ............ *B01J 19/0006* (2013.01); *G06N 3/02* (2013.01); *B01J 2219/00195* (2013.01); *B01J 2219/00216* (2013.01); *B01J 2219/00243* (2013.01)

(58) Field of Classification Search
CPC ............... B01J 19/0006; B01J 19/0033; B01J 2219/00213; B01J 2219/00216;
(Continued)

(56) References Cited

U.S. PATENT DOCUMENTS 3,728,085 A    4/1973  Horiguchi et al.
4,349,869 A *  9/1982  Prett ................... B01J 19/0033
                                                         702/108
(Continued)

FOREIGN PATENT DOCUMENTS

CA    2363378 A1    5/2002
DE    10347826 A1   5/2005
(Continued)

OTHER PUBLICATIONS

PCT International Preliminary Reporton Patentability in PCT/EP2017/072946 dated Mar. 19, 2019, 10 pages.
(Continued)

*Primary Examiner* — Lessanework Seifu
(74) *Attorney, Agent, or Firm* — Servilla Whitney LLC

(57) ABSTRACT

A test system comprising a reactor having a fluid circuit and a test zone for an item under test. A plurality of control zones are included in the fluid circuit for controlling parameters of the fluid in accordance with control information. A control system receives input data specifying test values for the fluid parameters, predicts the behaviour of the fluid using the input data and a mathematical model of the reactor, calculates control information based on the predicted fluid behaviour, and communicates the control information to the control zones. The system can simulate transient test conditions by selective use of fluid evacuation and dilution, and by use of temperature and flow bypass circuits.

25 Claims, 5 Drawing Sheets

(58) Field of Classification Search
CPC .... B01J 2219/00218; B01J 2219/00195; B01J 2219/00211; B01J 2219/00227; B01J 2219/00229; B01J 2219/00243
See application file for complete search history.

(56) References Cited

U.S. PATENT DOCUMENTS

| | | |
|---|---|---|
| 5,740,033 A | 4/1998 | Wassick et al. |
| 2007/0250214 A1 | 10/2007 | Lee et al. |
| 2012/0239220 A1 | 9/2012 | Wang |
| 2014/0064323 A1 | 3/2014 | Pelrin et al. |
| 2016/0169077 A1 | 6/2016 | Srinivasan et al. |

FOREIGN PATENT DOCUMENTS

| | | |
|---|---|---|
| JP | 2016114474 A | 6/2016 |
| JP | 2016121678 A | 7/2016 |
| WO | 2016118507 A1 | 7/2016 |

OTHER PUBLICATIONS

PCT International Search Report and Written Opinion in PCT/EP2017/072946 dated Jan. 17, 2018, 15 pages.
Stewart, Jonathan David, et al., "Sensitivity Analysis of Full Scale Catalyst Response under Dynamic Testing Conditions—A Method to Develop Further Understanding of Catalytic Converter Behavior Pt. 1", (abstract), SAE Technical Paper Series, vol. 1, Apr. 12, 2016, 1 page.
Machine translation of JP2016114474.

* cited by examiner

TEST SYSTEM WITH RECIRCULATING FLUID REACTOR

CROSS REFERENCE TO RELATED APPLICATIONS

This is a National Phase entry of International Application No. PCT/EP2017/072946, filed Sep. 12, 2017, which claims priority to United Kingdom Patent Application No. GB 1615561.6, filed Sep. 13, 2016, the disclosures of which are incorporated herein by reference in their entireties.

FIELD OF THE INVENTION

The present invention relates to product testing systems. The invention relates particularly to systems for testing the performance of products in varying environmental conditions and/or over time.

BACKGROUND TO THE INVENTION

It is common for manufacturers to have the performance of their products tested in varying environmental conditions and/or over time to assess, for example, how the products age or degrade in particular environments. The nature of such products varies widely and includes electrical and electronic components, mechanical components, lubricants, fuels, paints, coatings and chemical compounds. Usually, dedicated test equipment is designed to suit particular products and to carry out specific tests.

Conventional test equipment tends to be energy inefficient and inflexible. The testing process therefore tends to be expensive, limited in scope and slow. It would be desirable therefore to provide improved test equipment.

SUMMARY OF THE INVENTION

A first aspect of the invention provides a test system comprising:
   a reactor, the reactor comprising
      a fluid circuit,
      a test zone for at least one item under test, said test zone being included in said fluid circuit to expose said at least one item to fluid flowing in said circuit during use,
      a plurality of control zones included in said fluid circuit at a respective different location, each control zone including at least one control device for controlling at least one parameter of said fluid in accordance with control information; and
   a control system for controlling the operation of the reactor, the control system being in communication with said control zones to provide said control zones with said control information
   and wherein said control system is configured to:
      receive input data specifying at least one test value for said at least one parameter;
      predict the behaviour, in respect of said at least one fluid parameter, of said fluid using said input data and a mathematical model of the reactor;
      calculate said control information based on the predicted fluid behaviour; and
      communicate said control information to at least one of said control zones.

The mathematical model may take any suitable form, for example comprising a model that is suitable for use with model predictive control, or a model that is suitable for use with an artificial neural network.

A second aspect of the invention provides a test system comprising:
   a reactor, the reactor comprising
      a fluid circuit,
      a test zone for at least one item under test, said test zone being included in said fluid circuit to expose said at least one item to fluid flowing in said circuit during use,
      a plurality of control zones included in said fluid circuit at a respective different location, each control zone including at least one control device for controlling at least one parameter of said fluid in accordance with control information; and
   a control system for controlling the operation of the reactor, the control system being in communication with said control zones to provide said control zones with said control information,
   wherein said fluid circuit includes a fluid outlet, the reactor including an evacuation control zone having an evacuation control device that is operable to open or close said fluid outlet,
   and wherein said control system is configured operate said evacuation control device with said control information to control evacuation of fluid from said fluid circuit.

A third aspect of the invention provides a test system comprising:
   a reactor, the reactor comprising
      a fluid circuit,
      a test zone for at least one item under test, said test zone being included in said fluid circuit to expose said at least one item to fluid flowing in said circuit during use,
      a plurality of control zones included in said fluid circuit at a respective different location, each control zone including at least one control device for controlling at least one parameter of said fluid in accordance with control information; and
   a control system for controlling the operation of the reactor, the control system being in communication with said control zones to provide said control zones with said control information, wherein said fluid comprises a base fluid comprised of at least one bulk fluid, said system being connected to a source of said at least one bulk fluid by at least one fluid inlet device for introducing said at least one bulk fluid into said fluid circuit under control of said control system, and wherein said at least one bulk fluid comprises air, typically between approximately 10% to 100% air by volume.

A fourth aspect of the invention provides a test system comprising:
   a reactor, the reactor comprising
      a fluid circuit,
      a test zone for at least one item under test, said test zone being included in said fluid circuit to expose said at least one item to fluid flowing in said circuit during use,
      a plurality of control zones included in said fluid circuit at a respective different location, each control zone including at least one control device for controlling at least one parameter of said fluid in accordance with control information; and
   a control system for controlling the operation of the reactor, the control system being in communication with said control zones to provide said control zones with said control information, wherein said control system is configured to adjust any one or more of the composition, temperature or flow rate of said fluid in said fluid circuit, preferably to establish a base condition for said fluid in said circuit, by controlling the introduction of said at least one bulk gas into said fluid circuit to dilute the fluid in the fluid circuit.

A fifth aspect of the invention provides a test system comprising:
a reactor, the reactor comprising
a fluid circuit,
a test zone for at least one item under test, said test zone being included in said fluid circuit to expose said at least one item to fluid flowing in said circuit during use,
a plurality of control zones included in said fluid circuit at a respective different location, each control zone including at least one control device for controlling at least one parameter of said fluid in accordance with control information; and
a control system for controlling the operation of the reactor, the control system being in communication with said control zones to provide said control zones with said control information, wherein said fluid circuit includes heating means being operable to heat said fluid in said fluid circuit and wherein said fluid circuit includes a bypass circuit portion for diverting fluid around said heating means, and at least one valve operable to control the respective proportion of said fluid in said fluid circuit that flows through the bypass circuit portion and the heating means, and wherein said control system is configured to control the operation of said at least one valve in order to control the temperature of the fluid in said fluid circuit.

A sixth aspect of the invention provides a test system comprising:
a reactor, the reactor comprising
a fluid circuit,
a test zone for at least one item under test, said test zone being included in said fluid circuit to expose said at least one item to fluid flowing in said circuit during use,
a plurality of control zones included in said fluid circuit at a respective different location, each control zone including at least one control device for controlling at least one parameter of said fluid in accordance with control information; and
a control system for controlling the operation of the reactor, the control system being in communication with said control zones to provide said control zones with said control information, wherein said fluid circuit includes a bypass circuit portion for diverting fluid around said test zone, and at least one valve operable to control the respective proportion of said fluid in said fluid circuit that flows through the test zone bypass circuit portion and the test zone, and wherein said control system is configured to control the operation of said at least one valve in order to control the flow rate of the fluid in said test zone.

A seventh aspect of the invention provides a method of controlling at least one parameter of a fluid in a fluid reactor, the method comprising receiving, at a control system, input data specifying at least one test value for said at least one parameter; predicting, by said control system, the behaviour, in respect of said at least one fluid parameter, of said fluid using said input data and a mathematical model of the reactor; calculating, at said control system, control information based on the predicted fluid behaviour; and communicating said control information to at least one fluid control device.

An eight aspect of the invention provides a method of controlling at least one parameter of a fluid in a fluid reactor, said method comprising controlling evacuation of fluid from said fluid reactor to adjust the amount of recirculation of said fluid in said fluid reactor and/or to remove a calculated amount of said fluid from said fluid reactor.

An ninth aspect of the invention provides a method of controlling at least one parameter of a fluid in a fluid reactor, said method introducing at least one bulk fluid into said fluid reactor wherein said at least one bulk fluid comprises air, typically between approximately 10% to 100% air by volume.

A tenth aspect of the invention provides a method of controlling at least one parameter of a fluid in a fluid reactor, said method comprising adjusting any one or more of the composition, temperature or flow rate of said fluid in said fluid reactor, preferably to establish a base condition for said fluid in said reactor, by controlling the introduction of said at least one bulk gas into said fluid reactor to dilute the fluid in the fluid reactor.

An eleventh aspect of the invention provides a method of controlling at least one parameter of a fluid in a fluid reactor, the method comprising diverting at least some of said fluid around a heating apparatus in order to control the temperature of the fluid in said reactor.

A twelfth aspect of the invention provides a method of controlling at least one parameter of a fluid in a fluid reactor, the method comprising diverting at least some of said fluid around a test zone in order to control the flow rate of the fluid at said test zone.

Preferred features are recited in the dependent claims appended hereto.

Preferred embodiments of the system include a recirculating fluid reactor that is energy efficient and allows precise control of chemical composition, flow and temperature in one or more reaction (test) zones where the product or material under test is located. Advantageously, mathematical model based control is implemented at one or more control zones. Typically, operation of the reactor involves delivery of one or more gases and/or liquids into a closed system of fixed known volume. Triangulation of multiple measurement sources, predictive models and calibrated gas/liquid delivery systems ensures accuracy in a dynamic environment.

In preferred embodiments, the recirculating gas or liquid (fluid) reactor comprises at least one, normally two or more, recirculating gas systems/circuits with integral furnace, storage reservoir and blower. Heat is reused through an integral heat exchanger and may be stored throughout the system.

Preferred embodiments of the invention provide precision controlled delivery of known quantity(ies) of gas(es) at a known time and location in the fluid circuit with a known concentration and a known temperature. This enables at very high known levels of repeatability, accuracy and stability makes it possible to assess and compare performance and determine measurement system capability for a wide range of sensors and measurement systems under a wide range of operating conditions.

Preferred embodiments are capable of replicating full scale flow rate, temperature, chemical composition, distribution and agitation. Composition may mean the constituent fluids/gases and/or their concentrations as applicable, and may embrace chemical composition and/or mixture composition as applicable.

Further advantageous aspects of the invention will be apparent to those ordinarily skilled in the art upon review of the following description of a specific embodiment and with reference to the accompanying drawings.

BRIEF DESCRIPTION OF THE DRAWINGS

An embodiment of the invention is now described by way of example and with reference to the accompanying drawings in which like numerals are used to denote like parts and in which.

DETAILED DESCRIPTION OF THE DRAWINGS

Figure 1:
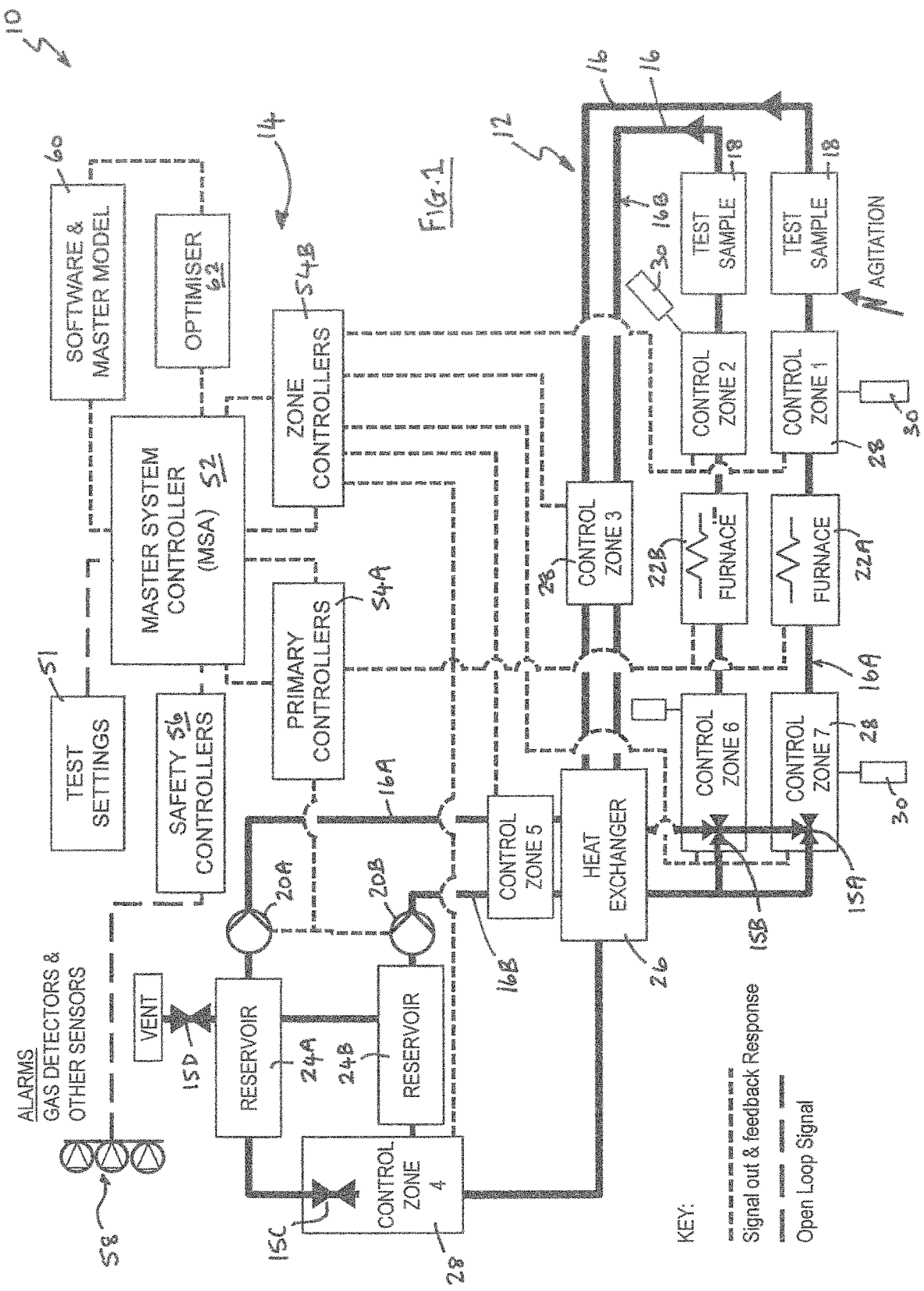
FIG. 1 is a schematic view of a testing system embodying one aspect of the invention.
Figure 2:
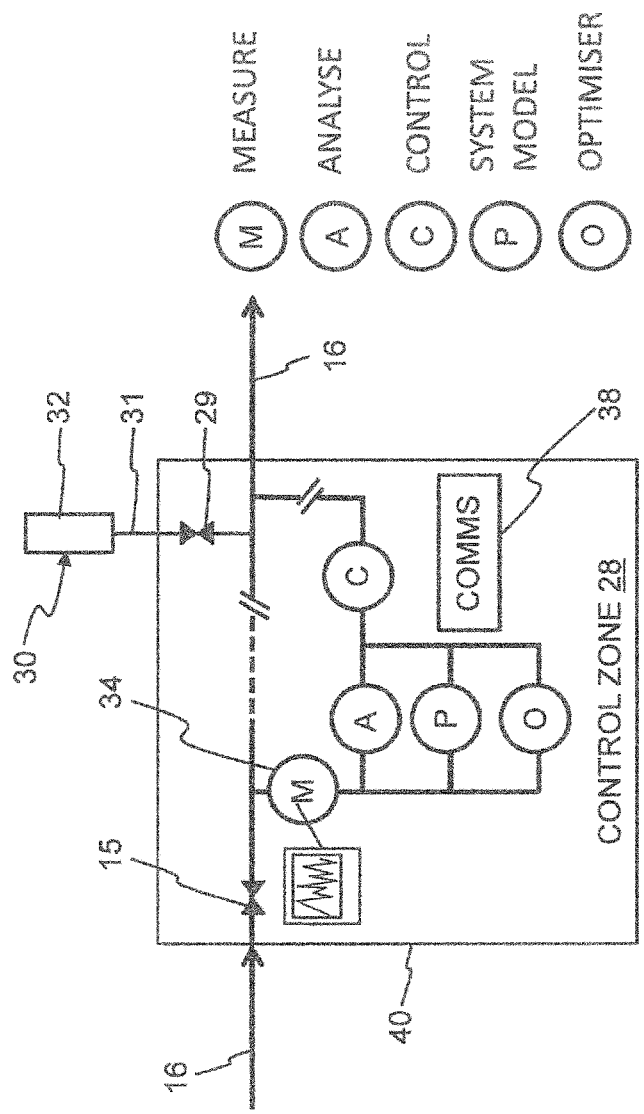
FIG. 2 is a schematic illustration of a control zone, being part of the testing system of FIG. 1.

Referring now to FIGS. 1 and 2 of the drawings there is shown, generally indicated as 10, a testing system embodying one aspect of the invention. The testing system 10 includes a reactor 12 and a control system 14 for controlling the operation of the reactor 12. The reactor 12 is intended to cause and control chemical reactions in use and may be described as a chemical reactor. The reactor 12 controls the exposure of one or more product under test (PUT)—not shown—to one or more fluids and may therefore be described as a fluid reactor. The fluid typically comprises one or more gases, in which case the reactor 12 may be described as a gas reactor, although liquids may also or alternatively be used. The reactor 12 includes one or more fluid circuits by which fluid may be recirculated within the reactor 12 and, as such, the reactor 12 may be described as a recirculating fluid reactor. As is described in more detail hereinafter, the reactor 12 may include one or more valves connected to one or more vents to allow all or part of the fluid in the reactor 12 to be evacuated, or removed, from the reactor 12, in particular during performance of a test. Hence, during a test anywhere between 0% and 100% of the fluid may be recirculated depending on what evacuation, if any, is performed. By controlling the relevant valves during a test, the amount of fluid being recirculated can be varied to suit the test.

Preferred embodiments of the system 10 are suitable for use with any desired PUT including but not limited to electrical components and articles, electronic components and articles, mechanical components and articles, liquids and chemicals (in liquid or solid form). Examples of specific products include but are not limited to integrated circuits, solid state devices, automotive parts and assemblies, catalysts, lubricants, fuels, paints and coatings, metals, alloys, materials and composites.

The reactor 12 comprises one or more fluid circuit 16 around which the fluid is circulated, and preferably recirculated, during use. In the illustrated embodiment the reactor has two fluid circuits 16A, 16B although in alternative embodiments there may be more or fewer fluid circuits. The fluid circuits 16 may be of any convenient construction, typically including any one or more of: pipe(s), tube(s), hosing, duct(s) and/or other fluid conduits. These may be formed from any convenient material, e.g. metal or plastics, and may optionally be thermally insulated.

Each fluid circuit 16 includes at least one respective test zone 18 in which one or more PUT is located in use. The test zone 18 may take any suitable form, for example comprising a chamber incorporated into the respective circuit 16 or being a part of a conduit that forms the circuit 16. The test zone 18 is in fluid communication with the respective fluid circuit 16 such that the fluid passes through the test zone 18 during use, thereby exposing the PUT to the circulating fluid. Optionally, the test zone 18 may include one or more mechanical device for exerting one or more mechanical force on the PUT, e.g. vibration, oscillation, stress, strain, tension, torsion, compression, loading, pressure and/or friction, and/or device(s) for creating and electric and/or magnetic field. Any conventional mechanical device(s) (not shown but represented in FIG. 1 as "Agitation") may be used for this purpose, e.g. vibrating or oscillating bed, spring(s), clamps(s), actuator(s), magnets, electromagnets and/or electric field generators. In addition the ambient conditions of the PUT may also be controlled. The system may include one or more devices for this purpose including any one or more of any conventional apparatus for heating or cooling the ambient environment, ambient humidity and/or for adjusting ambient air flow and/or ambient air pressure. This allows real world environmental conditions to be simulated around the test zone.

The reactor 12 may include one or more fluid reservoirs 24 for storing quantities of gas (or liquid) mixtures with known concentrations, and typically also for storing energy (i.e. by storing fluid at a temperature that is elevated compared to the fluid in the circuit In typical embodiments, each fluid circuit 16A, 16B includes a respective reservoir 24A, 24B. In alternative embodiments (not illustrated) the reservoirs can be omitted.

The reactor 12 includes pumping means 20 for causing the fluid to flow around each circuit 16. The pumping means may cause the fluid to flow around each circuit 16A, 16B individually, or to flow around a combined fluid circuit comprising all or part of each circuit 16A, 16B depending on the setting of one or more respective valves 15. Each circuit 16A, 16B may have its own pumping means 20A, 20B, which may be incorporated into the respective circuit 16A, 16B or otherwise operatively coupled to the respective circuit 16 in any conventional manner. Alternatively, common pumping means may be provided for more than one fluid circuit. In typical embodiments where the fluid is gas, the pumping means may comprise one or more fans. In the illustrated embodiment, a respective fan 20A, 20B is provided in each circuit 16A, 16B. The fans 20 may for example be centrifugal fans, or blowers, which may be incorporated in line into the respective circuit 16. More generally the pumping means may comprise any other appropriate pumping device including axial fans, propeller fans, centrifugal (radial) fans, mixed flow fans and cross flow fans, centrifugal pumps and positive displacement pumps, compressors and/or turbines. The pumping means are controllable to control the flow, and in particular the flow rate of fluid around the or each circuit 16A, 16B or any practicable combination circuit.

In the illustrated embodiment, valves 15A, 15B, 15C are configurable such that fluid may be pumped around both fluid circuits 16A, 16B simultaneously (i.e. when valves 15A, 15B and 15C are open), or around either one of the circuits 16A, 16B only (i.e. when the respective valve 15A, 15B is open and the other is closed). One or more other valves (not shown) may be provided as required to create one or more composite fluid circuits comprising all or part of the main fluid circuits 16A, 16B. Any one or more of the valves 15 may be operable to control the level of fluid flow restriction through the valve as a means of controlling fluid flow. An additional valve 15D may be provided which, when open, allows fluid pressure to be vented from reservoirs 24A, 24B. By controlling one or more relevant valves, pressure venting may be effected at any location around the circuit(s) where pressure is required to be relieved or a low pressure point is required.

The reactor 12 includes heating means 22 for controlling the temperature of the fluid in each circuit 16. In typical embodiments, the heating means comprises one or more furnace or other heating device. Each circuit 16 may have one or more respective heating devices, which may be incorporated into the respective circuit 16 or otherwise operatively coupled to the respective circuit 16 in any conventional manner. Alternatively one or more common heating devices may be provided for more than one fluid circuit. In the illustrated embodiment, a respective furnace 22A, 22B is provided for each circuit 16A, 16B. The furnaces 22 may for example be chemical or gas furnaces (e.g. a propane or natural gas furnace) or electrical furnaces (e.g. an infra red furnace, electrical tube furnace or flat bed furnace) or any other convenient heating device including electrical heater(s), infra red heater(s), gas heater(s) and/or heat lamp(s) (e.g. quartz or tungsten heat lamps). The heating means 22 are controllable to control and/or modulate the temperature of the fluid in the respective circuit 16 and so to control and/or modulate a base temperature in the test zone 18.

Preferably, the pumping means 20 and/or the heating means 22 are inverter controlled to provide relatively precise control to allow power modulation and help achieve desired set points as described in more detail below.

The reactor 12 may include one or more heat exchanger 26 to improve the efficiency of the reactor 12 in particular with respect to maintaining desired fluid temperatures in the reactor 12 energy efficiently. The or each heat exchanger may be incorporated into the or each fluid circuit 16A, 16B at, for example, locations where two or more fluid carrying conduits a relatively close. The heat exchangers may be gas to gas type, gas to liquid type or liquid to liquid type as appropriate.

The reactor 12 includes at least one but preferably a plurality of control zones 28. Preferably each fluid circuit 16A, 16B includes at least one control zone 28. Each control zone 28 may be incorporated into one or more fluid circuit 16A, 16B at a respective location.

Any one or more of the control zones 28 may be equipped to measure at least one aspect of the reactor's operation. Typically, each control zone 28 may be configured to measure one or more characteristic of the fluid at the respective location in the respective fluid circuit(s) 16 into which it is incorporated. As is described in more detail hereinafter, each control zone 28 may be configured to measure any one or more of the following fluid characteristics: flow rate, temperature, chemical composition, pressure.

Any one or more of the control zones 28 may be configured to control one or more characteristic of the fluid in the respective fluid circuit(s) 16, e.g. the fluid flow rate, temperature, chemical composition and/or pressure, and or to divert the fluid, e.g. to a vent or to a selected one of multiple circuit branches. To this end, each control zone 28 may include one or more control devices, e.g. one or more valves 15, fluid injectors 30 or fluid mixing devices, as described in more detail hereinafter. Any one or more of the respective control device(s) may be located at the respective control zone 28, in which case the control zone 28 controls the relevant fluid characteristic directly in its own locality. Alternatively, any one or more of the respective control device(s) may be located remotely from the respective control zone 28, in which case the control zone 28 controls the relevant fluid characteristic in one or more locations in the fluid circuit(s) remote from the control zone 28 itself. In such cases the control zone 28 may be said to include the control device in that it controls the operation of the control device.

In preferred embodiments, any one or more of the control zones 28 may be configured to monitor and control the introduction of one or more fluids, typically gases, into the respective fluid circuit(s) 16 into which it is incorporated. To this end, each such control zone 28 controls one or more fluid injectors 30. Each fluid injector 30 may take any conventional form, typically comprising one or more valves 29 and conduit(s) 31 connected to one or more fluid sources 32, e.g. a canister, a compressor and/or one or more of the reservoirs 24, usually pressured fluid sources. Each fluid source 32 may contain a single fluid or a mixture of two more fluids, depending on the application and the tasks being performed by the respective control zone. Each fluid injector 30 is operable to selectable inject one or more fluids into the respective fluid circuit(s) via one or more fluid inlets (not shown). Conveniently, the fluid inlet(s) are located at the respective control zone 28, although they may alternatively or additionally be located elsewhere in the fluid circuit(s). Conveniently, each fluid injector 30 is located at the respective control zone 28, although they may alternatively or additionally be located elsewhere in the fluid circuit(s). Optionally, one or more fluid injectors (not shown) may be provided for injecting fluid(s) into the reservoir(s).

In typical embodiments, the fluid circulating in the circuit(s) may comprise any one or more of the following: air, nitrogen, oxygen, carbon dioxide, carbon monoxide, water vapour, propane, propylene, oxides of nitrogen (NOx) or methane. The control zones or other fluid injection points may be configured to introduce any one or more of these fluids as required by the test specification (including to the reservoir as required). Typically the circulating fluid comprises a base fluid to which one or more other fluids are added, at one or more of the control zones as required, to implement the test specification to make a combined circulating fluid stream. The base fluid typically comprises one or more oxygen-containing gas, e.g. air, O2, NOx or CO2, and/or nitrogen and/or water vapour. The added fluids typically include one or more hydrocarbon, usually pure hydrocarbon, gas, e.g. propane, propylene or methane. The composition of the fluid, and the concentrations of its constituent parts, can vary depending on the test being implemented and/or during the course of the test as is describe in more detail hereinafter.

By way of example, a typical test might involve the following. At the beginning of test to remove air from the system 90% N2 and 10% CO2 may be injected into reactor 12 until all the air (or other fluid) is removed. Once at test temperature air and propane or propylene or methane or any combination thereof, as required, are injected into (in this example) control zones 1 & 2. At the same time air and propane are injected into control zone 3. There is a full flow gas mix typically comprising 0%-4% CO, 500-3000 ppm HC (hydrocarbon), 0%-21% O2, 10-15% CO2, 5-10% Water vapour and balance nitrogen. These may be typical steady state concentrations but can each be adjusted individually and can exceed the range shown or another gas type added, all dependant on the test specification being implemented.

Optionally, any one or more of the control zones 28 may be configured to control fluid flow balance in one or more of the fluid circuit(s) 16. Controlling fluid balance typically involves flow measurement on each circuit by means of a flow measuring device such as a venturi nozzle or orifice plate. Signals indicative of the real time pressure measurements are sent to into the master control where a mass flow rate calculation is performed. There may be one test sample 18 as shown on each circuit. Each sample may have different geometry with different back pressure thus altering the flow dynamics. If the master controller calculates that there is a difference in flow between the circuits it can effect compensation by the following means: 1. Adjustment of the rpm of fans 20*a* and/or 20*b* by using the fan inverters; and/or 2. Adjusting the operation of, e.g. by modulation of, one or both of the rotary flow valves to increase back pressure in one or both circuits to achieve equal mass flow across the test samples.

In order to monitor the relevant fluid characteristics and/or to monitor the injection of fluid by the respective fluid injector(s), each control zone 28 may include one or more sensors, which are represented generically in FIG. 2 as measuring device(s) 34. For example, the sensors may include one or more instances of any one or more of: a thermocouple, temperature sensor, a fluid flow measurement device (e.g. a venturi, impeller, orifice plate or other known flow measurement device), a Mass Flow Controller (MFC), a pressure transducer, a lambda/O2/NOxCAN sensor, a pressure transducer, gas analyser, fluid analyser, spectrometer (e.g. FTIR analyser) and/or an emissions analyser. Conveniently, any of the aforementioned sensors may be located at the respective control zone 28. Each control zone 28 may alternatively or in addition be co-operable with one or more remotely located sensor, e.g. one or more emissions analyser, spectrometer or other fluid analyser. In any event, one or more of the control zones 28 may perform analysis of any measurements detected by their respective sensor(s). As described in more detail hereinafter, this may result in the generation of one or more feedback signals for use by a control system. Alternatively, or in addition, one or more sensor outputs may be provided to the control system without analysis.

Any one or more of the control zones 28 may include one or more valve(s) 15 for controlling (including restricting and/or selectably preventing) the flow of fluid in the respective fluid circuit(s) 16, e.g. into (via one or more inlets), through (via one or more conduits) and/or out of (via one or more outlets) the control zone 28 itself.

It is noted that the configuration of each control zone 28 need not be the same, and may vary depending on which characteristic(s) of the system 10 the respective control zone 28 is intended to control and how the control is to be performed.

In order to communicate with other components of the system 10, including for example remote analyser(s) and/or a control system, each control zone 28 may include a communications system 38, including one or more wired and/or wireless communications devices as required.

The control zone 28 typically includes an enclosure 40 in which at least some of its components 15, 29, 31, 32, 38 are housed as is convenient. The enclosure 40 may for example comprise a chamber incorporated into the respective circuit(s) 16, or a chamber to which the respective conduits of the respective circuit(s) 16 are connected or pass through, or may comprise a part of one or more conduits that form the respective circuit 16.

The test system 10 includes a control system 14 for controlling the operation of the system components, including the control zones 28 (including operation of the sensors 34 and valves 15, 29 as applicable), fans 20, furnaces 22, mechanical agitation/force devices and/or device(s) for creating and electric and/or magnetic field. The control system 14 typically comprises one or more suitably programmed or configured hardware, firmware and/or software controllers, e.g. comprising one or more suitably programmed or configured microprocessor, microcontroller or other processor, for example an IC processor such as an ASIC, DSP or FPGA (not illustrated). The control system 14 is preferably reconfigurable in real-time and at least part of it may therefore conveniently be implemented by an FPGA. The control system 14 may be distributed throughout the system 10 or provided at a central location, as is convenient.

In preferred embodiments the control system 14 communicates control information to other components of the system 10, for example the control zones 28, fans 20 and/or the furnaces 22, in order to implement a test, for example in accordance with test settings (not illustrated) that may be provided to the control system 14 by any convenient means, for example a test settings interface unit 51. The test settings may specify environmental test conditions, for example in relation to temperature(s), chemical composition(s), flow rate(s), pressure(s) and/or agitation or other mechanical, electrical or magnetic forces, to which the, or each, PUT is to be exposed in the respective test zone 18. The control system 14 may also receive feedback information from other components of the system 10, for example the control zones 28 and/or the furnaces 22, in response to which the control system 14 may issue further control information to one or more relevant system components. To this end the control system 14 may perform analysis of the measurements or other information provided by the control zones 28. This analysis may be carried out automatically in real time by the control system 14. Alternatively, or in addition, analysis of the system measurements and performance may be made by an operator in real time or offline. The operator may make adjustments to the operation of the system 10 by providing control instructions via interface unit 51.

The control system 14 may comprise a master controller 52 and a plurality of sub-controllers 54. In the illustrated embodiment, the sub-controllers 54 include one or more primary controllers 54A and one or more zone controllers 54B. The primary controllers 54A control the operation of the fans 20 and the furnaces 22, and/or other system components such as mechanical agitation/force devices and/or device(s) for creating and electric and/or magnetic fields. A respective primary controller may be provided for each fan 20 and/or for each furnace 22 and/or other respective system component. The zone controllers 54B control the operation of the control zones 28. A respective zone controller 54B may be provided for each control zone 28. Under the control of the master controller 52, the primary controllers 54A and zone controllers 54B may send control signals to and receive feedback signals from the respective fan, furnace or control zone. The primary controllers 54A and zone controllers 54B provide feedback signals to the master controller 52 based on the feedback received from the respective fan, furnace or control zone. The sub-controllers 54 may also include one or more safety controllers 56, which may receive alarm signals from one or more alarm sensors 58, e.g. gas sensors or leak detectors or emergency stop, that may be included in the system, and provide alarm information to the master controller 52 based on the alarm signals received from the alarm sensors 58. It will be understood that the master controller 52 and sub-controllers 54 may be implemented in any convenient manner, for example as one or more separate hardware, firmware and/or software components of the overall control system 14.

In preferred embodiments, the control system 14, and more particularly the master controller 52 is configured to implement system modelling logic, e.g. by supporting mathematical modelling software or firmware 60, for enabling the control system 14 to mathematically model the behaviour of the system 10, and in particular of the reactor 12, depending on the test settings and/or on feedback signals received from one or more system components during operation of the system 10.

Preferably, the control system 14 is configured to implement Model Predictive Control (MPC). Using MPC, the control system 14 causes the control action of the control zones 28 to be adjusted before a corresponding deviation from a relevant set point actually occurs. This predictive ability, when combined with traditional feedback operation, enables the control system 14 to make adjustments that are smoother and closer to the optimal control action values than would otherwise be obtained. A control model for the system 10 can be written in Matlab, Simulink, or Labview by way of example and executed by the master controller 52. Advantageously, MPC can handle MIMO (Multiple Inputs, Multiple Outputs) systems.

Alternatively, the control system 14 may be configured to implement an artificial neural network (ANN). Conveniently, the master controller 52 may be configured to implement the ANN. By way of example the ANN may comprise a multilayer, feed-forward artificial neural network, preferably with biased neurons. In use, at least one neural network model is trained using input data received from any relevant part of the system 10 by means of at least one learning algorithm (and typically one or more cost function) to produce one or more output (e.g., one or more set point) for controlling relevant parts of the system 10. The ANN may for example be trained using a back propagation algorithm, preferably with automatic learning rate, momentum term and/or data normalisation. In use, the ANN-based control system 14, or more particularly the master controller 52, provides each control zone 28 and/or each primary controller 54A (as applicable) with a set point for each parameter that it monitors and also receives feedback data from the zone 28 and/or primary controllers 54A (as applicable). The ANN allows the control system 14/master controller 52 to change the set points as required, as is determined by the ANN self learning algorithm. The primary controllers 54A and zone controllers 54B monitor the respective parameters and may initiate a control action as required. Optionally, the primary controllers 54A and/or zone controllers 54B may be configured to implement a respective (localised) ANN (which may be changing constantly) to perform the relevant control action.

The ANN-based control system 14 mathematically models the reactor 12 using at least one neural network model that is trained by the behavior of the reactor 12. The preferred ANN-based control system 14 operates on the basis of pattern recognition and computational learning theory in artificial intelligence. It constructs algorithms and makes predictions for controlling the respective zones 28 based on data gathered from system inputs and historical data. The preferred ANN-based control system 14 provides the capability to isolate, counteract and control each of the control parameters in real time.

By way of example, the ANN-based control system 14 may take as input one or more parameter profile (e.g. O2 profile or other fluid profile) that is desired to be delivered at a respective location in the reactor 12, e.g. at an input to a test zone 18. The input profile may be obtained from a test specification. The input may also include one or more measured and/or delivered fluid (e.g. O2) profiles, or other parameter profiles, as provided by one or more sensor 34 (e.g. an MFC) (which may related to one or more control zone or one or more test zone as applicable). The input may further comprise historical data (e.g. relating to measured and/or delivered fluid profiles and/or control actions) maintained by the control system 14 for use by the ANN. Using the ANN, the control system 14 produces as output one or more parameter profile (e.g. O2 profile or other fluid profile) that for delivery at a respective location in the reactor 12, e.g. at an input to a test zone 18, and/or corresponding control information for achieving the calculated profile(s). The output data is added to the historical data as appropriate and used to update the ANN.

Typically, the master controller 52 receives input data defining the test specification to be implemented and predicts the behaviour, in respect of at least one parameter of the fluid in the reactor, of the fluid by applying the test specification to one or more mathematical model of the reactor (which may comprise a mathematical model used for implementing Model Predictive Control (MPC), or a trained neural network model as applicable). The controller 52 calculates control information for the control zones based on the predicted fluid behaviour and communicates the relevant control information to the relevant control zones.

In preferred embodiments, the fluid parameters in respect of which predictions are made and control information calculated comprise a fluid composition parameter indicating the chemical composition of the fluid, a temperature parameter indicating the temperature of the fluid and a flow rate parameter indicating the flow rate of the fluid. The chemical composition may comprise which fluid(s) are present in the overall fluid mixture in the reactor and/or the relative concentrations of the fluids that are present. Using the test specification and the mathematical model, the controller 52 calculates one or more side effects on, or other interaction(s) between, any one or more of the composition, temperature and flow rate of said fluid that, according to the model, would result from implementation of one or more aspects of the test specification. Such side effects may be a result of a predicted interaction between any two or more of the fluid composition, fluid temperature and fluid flow rate stipulated in the test specification. The controller 52 then generates the control information for the control zones based on the predicted behaviour of the system. The control information takes into account any predicted side effects or other predicted interactions, optionally including control information for causing one or more control zones to take action that neutralises or at least mitigates the predicted side effects or other predicted interactions. The control information is then communicated to the relevant control zones.

In preferred embodiments, the controller 52 is configured to predict the behaviour, in respect of the or each relevant fluid parameter of the fluid at one or more locations in the fluid circuit using the control information and/or the test specification, and the mathematical model of the reactor, to calculate further control information based on the predicted fluid behaviour; and to communicate the further control information to the or each relevant control zones. Conveniently, the controller 52 sends the further control information to one or more control zones associated with the or each location, usually as well as sending control information to one or more control zones associated with one or more other locations in the fluid circuit(s). In this way the controller 52 is able to cause one or more control zones associated with specific locations in the fluid circuit to take action to neutralise, mitigate or otherwise take into account, the predicted effects that implementing the test specification will have at one or more specific location in the circuit. This aspect of control may be performed in respect of any one or more of the fluid parameters.

The model based predictive nature of the control facilitates precision controlled delivery of known quantity(ies) of gas(es) at a known time and location in the fluid circuit with a known concentration and a known temperature with very high known levels of repeatability, accuracy and stability, making it possible to assess and compare performance and determine measurement system capability for a wide range of sensors and measurement systems under a wide range of operating conditions.

In preferred embodiments, the control system 14 includes an optimiser 62 for performing optimisation when generating control information, e.g. set points, for communication to the control zones 28 and other system components. Given a transformation between input and output values, described by a mathematical function, optimisation involves generating and selecting a best solution from a set of available alternatives by systematically choosing input values from within an allowed set, computing the output of the function and recording the best output values found during the process. The optimizer 62 may be created in Matlab, Simulink, or Labview for example and run by the master controller 52.

In order to communicate with other components of the system 10, any system component, including the control zones 28, fans 20, furnaces 20, mechanical agitation/force devices and device(s) for creating and electric and/or magnetic fields, is provided with any convenient convention wired and/or wireless communications devices as required. The system components, including the control zones 28, fans 20, furnaces, mechanical agitation/force devices and/or device(s) for creating and electric and/or magnetic fields, are responsive to signals received from the control system 14 to perform one or more corresponding operations and/or to modify their performance of one or more operations, as is described in more detail below.

Typically, the control system 14 provides any one or more of other system components, including the control zones 28, fans 20, furnaces 22, mechanical agitation/force devices and/or device(s) for creating and electric and/or magnetic fields, with one or more set points each indicating a desired value one or more parameters connected with the operation of the respective system component. For example the parameter may relate to fluid characteristics: flow balance, flow rate, temperature, chemical composition, pressure, or may relate to agitation or other mechanical, electrical or magnetic forces, and/or to fan speed or furnace temperature. The set points may be obtained from or derived from the test settings and/or may be calculated by the control system 14 based on feedback signals received from one or more other system components, including the control zones 28, fans 20, furnaces 22, mechanical agitation/force devices and/or device(s) for creating and electric and/or magnetic field. The master system controller can also control the environmental test conditions, (such as ambient temperature (including sub zero applications), altitude, humidity and flow rate etc over the PUT) for the PUT but these systems may alternatively be independently controlled with local controllers. In the preferred embodiments, the foregoing is implemented by the master system controller 52 in conjunction with the primary controllers 54A and zone controllers 54B as applicable.

In preferred embodiments, the master system controller 52 may be referred to as a real time reconfigurable control and monitoring system, and may comprise a user-programmable FPGA, advantageously with custom hardware for high-speed control, inline data processing and complex timing and triggering control facilities.

In typical operation of the preferred embodiment, the master system controller 52 takes an overview of the system 10, including the sub-controllers 54. The master controller 52 provides each zone controller 54B and primary controller 54A with a respective set point for the, or each, parameter that it monitors, and advantageously also receives feedback signals from the zone 54B and primary controllers 54B, which allows it to change the set points as required. Advantageously, the calculation of set points in response to the feedback signals is performed by the modelling software 60, optionally in conjunction with the test settings as applicable). The primary and zone controllers 54A, 54B monitor their respective parameter(s) by monitoring the operation of the respective system component (e.g. furnace 22, fan 22 or control zone 28), and may initiate control action if deviation from the respective set point is observed. The control action may involve adjusting the operation of the respective system component, e.g. changing the speed of a fan 20, changing the heat of a furnace 22, or adjusting the quantity, rate and/or composition of fluid(s) being injected into the system at a control zone 28. As such, the respective zone controllers 54B may provide all or part of the respective control system 36 of the respective control zone 36, and may be located at the respective control zone 28 or remotely from it.

In preferred embodiments, the system 10 continuously monitors and, as necessary, controls one or more characteristics of the fluid flowing in the recirculating fluid circuit(s) 16, the characteristics advantageously including the chemical composition of the fluid. This is achieved by integrated control of supply gases (or other fluids), in particular at the control zones 28, and by control of chemical reactions (primary & secondary) of the fluids (typically gases), and of fluid temperature and flow rates at one or more locations in the fluid circuit(s), typically at one or more of the control zones 28. In preferred embodiments, the system 10 is able to isolate, counteract and control chemical reactions under high flow and high temperature conditions.

In preferred embodiments, each control zone 28 is operable to monitor and control any one or more of the following system parameters: fluid flow rate; fluid flow balance; delivery of supply fluid into the respective fluid circuit(s) 16; fluid composition (e.g. of the fluid being injected at one or more respective injection points and/or of the fluid flowing in the fluid circuit at the respective control zone); fluid temperature (e.g. of the fluid being injected at one or more respective injection points and/or of the fluid flowing in the fluid circuit at the respective control zone); fluid flow and mixture distribution.

Control of system flow rate (and optionally of flow balance between fluid circuits) of the fluid flowing through the test zones 18 may be achieved by any one or more of (i) control of the pumping means (e.g. fan blower/air mover assembly(ies)), preferably by way of inverter control, (ii) combining fluid flow from multiple reservoirs 24A, 24B and/or fluid circuits 16A, 16B, and (iii) controlling valves 15 (e.g. either between fully open and fully shut states or one or more partially open states which restrict fluid flow by different amounts). In preferred embodiments control of the fan 20 or other pumping means is performed by the respective primary controller 54A. One or more of the control zones 28 may include or may otherwise control one or more valves 15 by which flow control methods (ii) and (iii) may be implemented.

With regard to flow balance, it may be desirable during testing to create a substantially equal fluid flow (e.g. in terms of flow rate, pressure and/or composition) across multiple test samples (PUTs) located in different test zones 18. Achieving this involves control and modulation (e.g. controlling the angle of the rotary control valve to control back pressure thus flow rates of each circuit) of one or more valves 15 that are operable to selectively connect or isolate two or more respective fluid circuits 16 and/or to adjustably restrict the flow of fluid between two or more respective fluid circuits 16. Preferably, the valves 15 are rotary control valves. Conveniently one or more of the control zones 28 controls the operation of one or more respective valves 15 for the purposes of flow balance control. Control of flow balance may also be assisted by the use of symmetry in the reactor (in particular of the fluid circuit) design and if necessary the use of flow obstruction to balance back pressure.

It is desirable to be able to control precisely the supply of fluid(s) to the fluid circuit(s) 16, in particular the quantity of fluid being delivered and the timing of the delivery. To this end, one or more of the control zones 28 may include one or more of the fluid injectors 30. Preferably, the fluid injectors 30 comprise a Mass Flow Controller (MFC) to facilitate fast and precise control of the fluid delivery in conjunction with valve 29, which may be a solenoid valve. Hence, the preferred fluid injector 30 is capable of delivering fluid into the respective fluid circuit(s) 16 at relative high speed, thereby allowing any additional fluid(s) to be injected into the system with any desired delivery profile with time. Advantageously, the MFC allows the control zone 28, and therefore the control system 14, to determine, in particular measure, the fluid profile that is actually delivered to the system 10 and this facilitates determining and acting to correct errors in the feedback control implemented by the control system 14.

Individual gas composition concentrations in a control zone 28, or elsewhere in the fluid circuit(s), may be manipulated in any one or more of the following ways:

A. Using the respective fluid injector(s) 30. This advantageously enables fluid to be added to the respective fluid circuit(s) 16, usually at the location of the respective control zone 28, with a controlled delivery profile over time. This is facilitated by the preferred use of Mass Flow Controllers. In preferred embodiments the injection of fluid(s) in this way involves the injection of calibrated known gas concentrations into a closed system of a known fixed volume, i.e. the respective fluid circuit(s) 16. The volume may change if the configuration of the circuit(s) changes but may be deemed to be known of any given time period between reconfigurations. It is noted that the fluid being injected by any given fluid injector 30 may be a pure gas or liquid, or a mixture of two or more gasses or liquids, and that any given control zone 28 may have control of one or more such fluid injectors 30.

B. Precisely timed separation/bypass, storage and/or release is another key way to control fluid composition and/or concentration. For example if there is an undesirable quantity, or 'package' of gas mixture present in the circuit, the system can ensure that it does not reach the test sample by any one or more of the following techniques: 1. Separation/bypass—this involves diverting, by controlling one or more relevant valves, the package away from the sample by sending it down another pipe (see FIG. 5 which shows a bypass pipe for this purpose) and possibly back to the reservoir for dilution or to another control zone for neutralization; 2. Storage—by storing an undesirable package of gas/fluid in a reservoir until it can be called into the process. 3. Release—this involves evacuation of the undesirable package of gas mixture by precisely timing its release from the circuit to the vent by use of one or more valves controlled by the master controller (evacuation typically being achieved by creating a low pressure point in the reactor). It may be desirable to keep the package of gas moving through pipework with a low cross sectional area to discourage diffusion. It also allows neutralization in a system catalyst (which may be provided in a suitable control zone or included elsewhere in the fluid circuit as required), or other neutralizing control zone, to occur in a more controlled fashion. In order to aid release, one way valves may be used to ensure flow only goes in one direction, and provide means of controlling pressure gradients around the system in a 'no flow' situation.

C. Causing and/or controlling chemical reactions to produce new fluid(s), in particular gas(es), in the fluid circuit(s) 16. Quantities of fluids, especially gases, can be created at desired concentrations at on or more locations in the fluid circuit(s) 16 using any convenient method, including any one or more of: providing one or more system catalyst, causing one or more spontaneous chemical reaction, controlled increase of surface area of reactants or fluid concentrations, provision of one or more enzymes, temperature manipulation, pressure manipulation, provision of electromagnetic radiation, provision of UV light. Any one or more of these methods may be implemented at any one or more locations in the fluid circuit(s) 16, for example at one or more of the control zones 28. Any necessary devices for implementing the methods (e.g. UV light source or other EM radiation source, heater, pressure device) may be provided at any one or more appropriate locations in the fluid circuit(s) 16, for example as part of one or more of the control zones 28, and may be controlled by the control system 14 as part of a control zone 28. It will be understood that some of the above methods may be implemented by injecting one or more fluids, e.g. appropriate reactants, into the fluid circuit(s) 16 at a desired location and with a desired delivery profile (quantity and timing).

D. Neutralisation of quantities of unwanted gas (or other fluid) mixture in the fluid circuit(s) 16. This may involve providing one or more system catalyst at one or more locations in the fluid circuit(s), e.g. at one or more of the control zones 28, and causing one or more of the fluid injectors 30 to inject one or more appropriate neutralising reactants at the relevant injection point with a desired delivery profile (quantity and timing)

E. The provision of one or more fluid filters, for example membrane filters, in the fluid circuit(s) 16 for reducing or removing gas/fluid concentrations by way of diffusion or by hydrodynamic means.

The temperature in the control zone 28 can be controlled in any one or more of the following ways: (i) controlling the operation of the, or each, furnace 22 (or other heaters), in particular by precise and stable control of power delivered by the furnace(s). Each furnace can be set differently to create the desired temperature; (ii) controlling the gas/fluid concentrations and/or mixing to promote exothermic or endothermic reactions affecting the temperature. This may be achieved using the respective fluid injector(s) 30; (iii) the provision of one or more auxiliary heating or cooling devices and/or implementation of waste heat recovery methods.

In order to flow and mixture distribution, it is preferred to deliver fluids, in particular gases, into the fluid circuit(s) 16 through an inlet (not shown) having a plurality of apertures through which the fluid flows simultaneously, e.g. comprising a mesh, lattice or a grille. The size and spacing of the apertures affects the mixing and distribution of the injected fluid with the fluid already present in the fluid circuit, which in turn may affect any chemical reaction that may occur upon injection of the fluid. For example a relatively high density of relatively small apertures promotes a relatively fine fluid injection spray resulting in relative high homogeneous mixing with the main fluid flow. This is advantageous when it is desired to create and encourage localised chemical reactions at or near the fluid injection point. Conversely, a relatively low density of apertures reduces and retards chemical reactions. Hence, at any fluid injection point (e.g. of the fluid injector(s) 30 of any control zone 28) the size and spacing of the inlet apertures can be selected to deliver the desired mixing characteristic. The selected aperture size and spacing may therefore differ from injection point to injection point. Conveniently, the aperture inlet may be provided as part of the conduit or other structure from which the relevant control zone or other part of the fluid circuit is formed. The fluid injectors 30 may be arranged so that the fluid is injected substantially perpendicularly to the main fluid flow in the respective part of the fluid circuit or respective control zone. The angle of injection can be changed to promote or discourage rates of reaction.

It will be apparent that control measures effected at the control zones 28 have an affect on the environmental conditions at the test zones 18.

In FIG. 2, the control zone 28 is shown with Analyse A, Control C, System Model P and Optimiser O elements. These represent the analysis, modelling, optimizing and control performed by the control system 14 (for the MPC embodiment) in respect of the control zone 28 and do not necessarily represent components of the control zone itself.

Optionally, one or more primary fluid circuits 16 may be provided for subjecting the PUT(s) to testing conditions, and one or more secondary fluid flow circuits (not shown) may be provided for supporting the operation of the primary fluid circuit(s). The secondary circuit(s) may for example be used for any one or more of: 1. Isolating or cleaning the primary circuit(s) of contaminants; 2. Creating reaction gases/fluids for the primary circuit(s); 3. Creating secondary reaction gases of known gas concentrations (e.g. that can be stored in a reservoir or in pipework and is delivered to the primary circuit(s) by the control system when required. One or more valves (now shown) may be provided for connecting and disconnecting the secondary and primary circuits are required, under control of the control system 14.

Optionally, one or more contaminants, e.g. poisons, which may be in solid, liquid or gas form, may be added to the fluid circuit(s) 16 under control of the control system 14. The contaminants may be added at any desired located in the circuit(s), conveniently at a control zone 28 or at a test zone 18. A fluid injector 30 or other injection device may be used for this purpose. Where the contaminant is solid, it may be dissolved in a solvent and, if required, vaporised before entering the test zone 18 or other circuit location.

It will be apparent from the foregoing that the invention may be embodied as testing equipment that reproduces high temperature, high flow and changing chemical composition controlled conditions in a highly energy efficient and repeatable manner. The preferred system can measure and record real time system data to ensure precise record of conditions and test sample response. Systems embodying the invention can be used for any one or more of the following applications: real world simulations for comparative product evaluations; usage life determination of high temperature and high flow components; as a development tool for materials, components, lubricants and fuels; as a durability/ageing tool; as an experimental tool to develop understanding on the behavior of materials, compounds, products coatings at high temperature over time; as a simulation tool to develop and prove-out algorithms and models characterizing test sample/system performance.

In typical embodiments, the most complicated control zones 28 are those just before, i.e. immediately upstream of, the test zone(s) 18. Typically these control zones 28 have multiple fluid inlets and multiple measurement locations and/or measurement sensors 34.

In preferred embodiments, a respective control zone 28 is provided upstream, preferably immediately upstream, of each test zone 18. It is preferred that a respective control zone 28 is provided at the exit, i.e. downstream, preferably immediately downstream, of each furnace 22. Optionally, as per the illustrated embodiment, a control zone 28 is provided between a furnace and a test zone 18 so that it is both upstream, preferably immediately upstream, of the test zone 18 and downstream, preferably immediately downstream of the furnace.

In preferred embodiments, a respective control zone 28 is provided upstream, preferably immediately upstream, of each heat exchanger.

Preferably a respective control zone 28 is provided between each reservoir 24 and the inlet to the respective furnace 22, i.e. downstream of the reservoir and upstream of the furnace.

In practice the number and locations of control zones depends on the tests to be carried out by the system. There may therefore be more or fewer than illustrated in FIG. 1. The control zones can be located anywhere in the fluid circuit(s), although the location may depend on the purpose of the control zone, e.g. to promote chemical reactions or achieve specific test conditions at another location in the system.

Typically, control zones that are equipped to inject fluid into the circuit(s) 16 are located (or at least their fluid injector(s) are located) either before (e.g. at the inlet) a furnace 22, after (e.g. at the outlet) a furnace, or before (e.g. at the inlet) the heat exchanger.

In the embodiment illustrated in FIG. 1, control zones 1, 2, 6 and 7 may each be equipped to perform all of the monitoring and control functions: fluid flow rate; fluid flow balance; delivery of supply fluid into the respective fluid circuit(s) 16; fluid composition (e.g. of the fluid being injected at one or more respective injection points and/or of the fluid flowing in the fluid circuit at the respective control zone); fluid temperature (e.g. of the fluid being injected at one or more respective injection points and/or of the fluid flowing in the fluid circuit at the respective control zone); fluid flow and mixture distribution. However, these control zones do not necessarily perform the same function within the system 10. For example control zones 1 and 2 may be used by the control system 14 to achieve specific test conditions in the respective test zone 18, while control zones 6 and 7 may be used to condition, or clean, the fluid in the fluid circuit. Control zone 3 may also be similarly equipped and used to perform a fluid conditioning/cleaning function.

Control zone 4 may be used only to perform a fluid checking function and may therefore be equipped to monitor (and optionally control) fluid flow balance and temperature. Control zone 5 may be used and equipped to monitor (and optionally control) fluid flow balance, flow rate and temperature.

It is noted that in addition to the components of the control system 14 already described, some system components, for example independent valves, control devices or actuators, may have their own controller (e.g. processor) for controlling their operation. A specific example of this would be the MFC which is preferably used to measure and control the injection of liquids and gases.

It will be apparent from the foregoing that, in preferred embodiments, each of the control zones 28 operates to control one or more respective fluid characteristic in accordance with a respective set point determined by the master controller 52. The master controller 52 monitors the performance of all of the control zones 28 and can therefore analyse the overall system behaviour, allowing it to determine control actions for each control zone in an integrated manner, preferably by predicting the system's 10 future behaviour based on present feedback signals received from the control zones 28. Advantageously, the master controller 52 has the ability to anticipate and predict conditions at multiple locations of the system 10 at any given time, to account for that by adjusting set points and to cause the respective control zones 28 to implement the respective control actions in a coordinated manner, i.e. to cause the desired control actions to take place at the desired location(s) and at the desired time(s) in the fluid circuit(s) 16. The control system 14 may continuously perform control actions and corrections as the fluid moves around the fluid circuit(s) 16. The specification of the desired fluid mixture, flow rate and temperature may change over time at each control zone as determined by the master controller 52 in response to the test settings and/or feedback received from the control zones 28.

Figure 3:
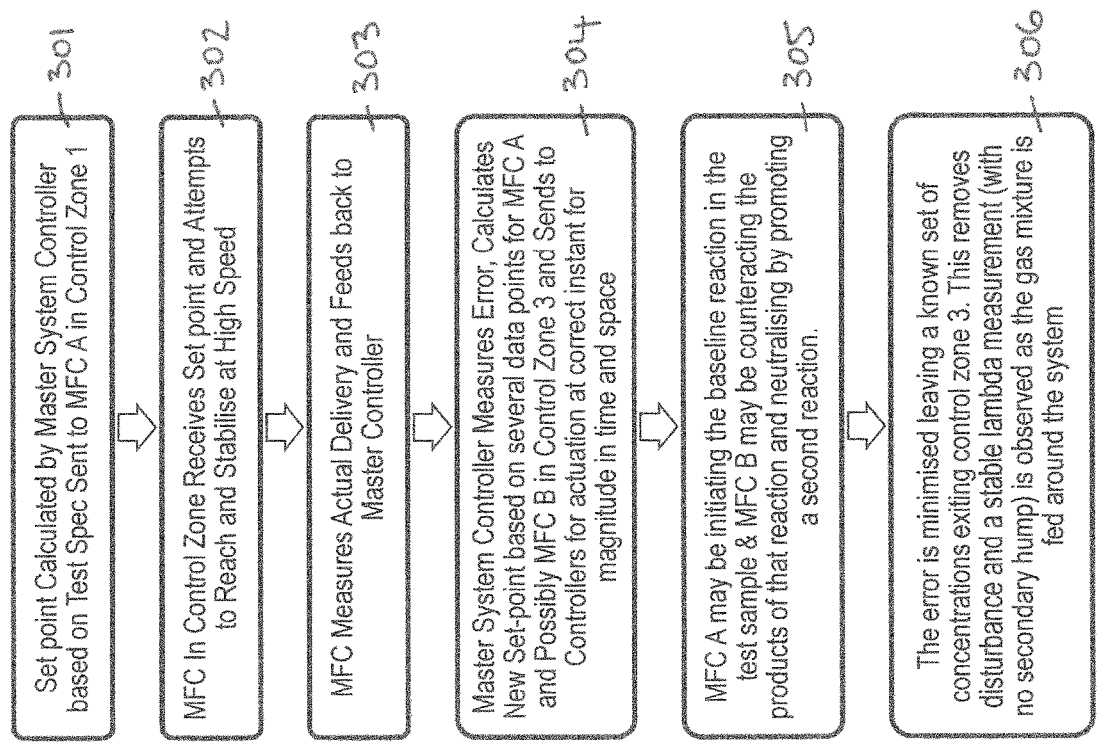
FIG. 3 is a flow chart illustrating exemplary actions of a mass flow controller in conjunction with a system controller, each being part of the system of FIG. 1.

FIG. 3 shows an example of the interaction between the master controller 52 and Control Zones 1 and 3, assuming by way of example that Control Zones 1 and 3 includes a respective MFC to control the injection of a fluid into the fluid circuit 16A and that it is desired to inject a specified amount of fluid in accordance with a set point. At 301, the set point is calculated by the master controller 52 based on the test settings, and is communicated to control zone 1, in particular to the MFC of the relevant fluid injector 30. At 302, the MFC receives the set point and attempts to implement the specified injection by attempting to reach the set point and stabilise at high speed. At 303, the MFC measures the actual fluid delivery and feed this information back to the master controller 52. At 304, the master controller 52 measures the error between the set point and the actual delivery, calculates a new set point, typically based on multiple data points for the MFC of control zone 1 and possibly the MFC of one or more other control zones, e.g. Control Zone 3, and sends the relevant set points to the respective control zones for coordinated implementation. At 305, the MFC of Control Zone 1 may be initiating a baseline chemical reaction in the test sample in test zone 18A, while the MFC of Control Zone 3 may be acting to counteract the products of that reaction and/or neutralising them by promoting a second reaction. At 306, the error is minimised leaving a known set of concentrations exiting control zone 3.

Figure 4:
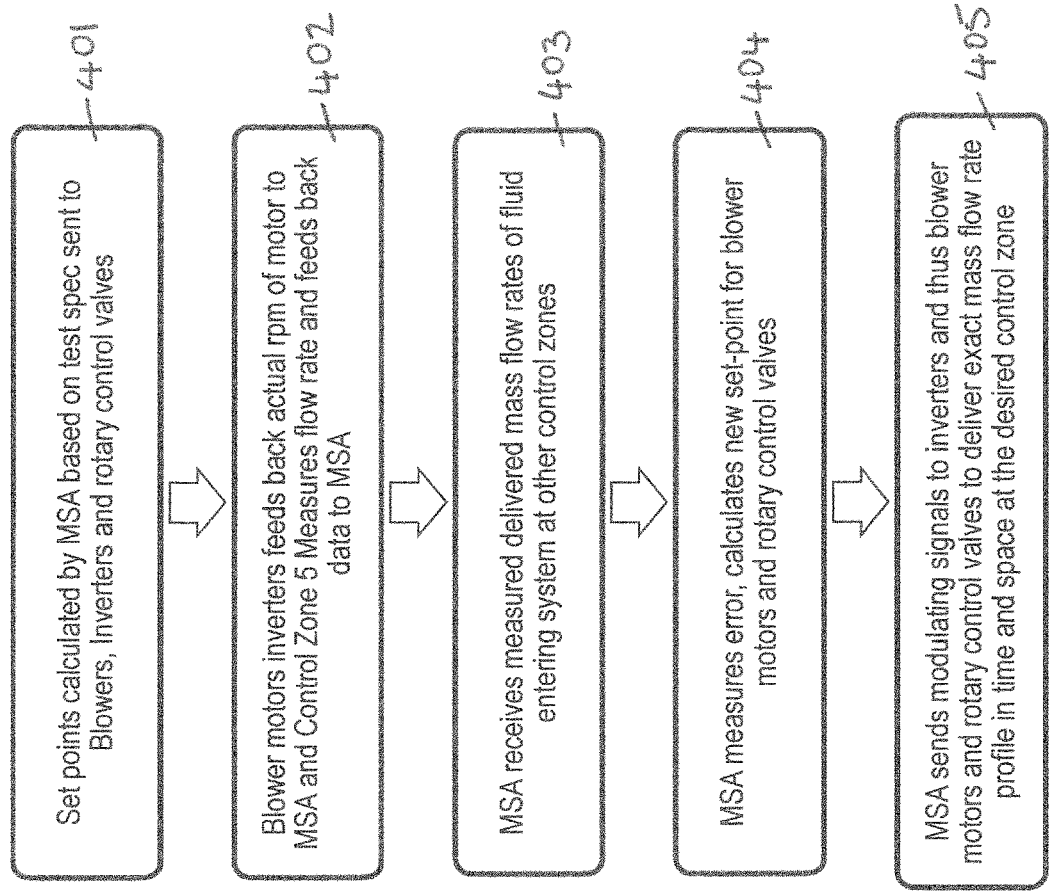
FIG. 4 is a flow chart illustrating exemplary flow control actions implemented by the system controller.

FIG. 4 shows an example of the interaction between the master controller 52 and fans 20 and rotary control valves. At 401, respective set points (for fan speed) are calculated by the master controller 52 based on the test settings, and are communicated to the fans 20. At 402, the fans 20 feed back their actual speed to the master controller 52. The master controller 52 also receives flow rate information from Control Zone 5. At 403, the master controller 52 may receive information on flow rates of fluid into the fluid circuit(s) 16 at one or more of the other control zones 28. At 404, measures the flow rate error and calculates new set points for the fans 20 based on the feed back information. At 405, the master controller 52 sends the new set points to the fans 22 to create a desired flow rate in the relevant control zone(s).

When performing a test it is desired to establish a set of known base conditions for the fluid at at least one location upstream of the test zone (i.e. at or before the inlet of the test zone, e.g. a location between the reservoir and the test zone in typical embodiments), the base conditions typically being defined by the composition, temperature and flow rate of the fluid. Once the base conditions have been established, one or more of the parameters of composition, temperature and flow rate can be adjusted (again at a location upstream of the test zone) in accordance with the test specification, e.g. by the injection of known quantities of one or more gases (usually hydrocarbon gases), so that the item in the test zone is subjected to the test conditions (usually defining the fluid composition, temperature and flow rate in the test zone) stipulated in the test specification. The corresponding conditions of the fluid exiting the test zone tends to differ from the base conditions in respect of at least one of the defining parameters not only because of any adjustments made in accordance with the test specification but sometimes as a result of mechanical and/or chemical processes that may take place in the test zone (which depend on the test being performed and on the item being tested). For reasons of efficiency, it is preferred to recirculate at least some of the fluid exit stream and so it is necessary to adjust one or more of the composition, temperature and/or flow rate, as required, of the fluid exit stream in order to re-establish the desired base conditions (or establish a different set of desired base conditions as required by the test specification) at the relevant upstream location(s). This allows the or each test being performed to be accurate and repeatable. Establishing and re-establishing the base conditions can be performed by the controller 52 using any one or more of the techniques and apparatus described above with reference to FIGS. 1 to 4.

For some tests, one or more of the fluid parameter values stipulated by the test specification may change relatively quickly during the test, or between successive tests and/or between successive cycles of the same test. In order to reliably and accurately produce such transient fluid conditions it is necessary to establish or re-establish the desired base conditions very quickly. Preferred techniques for achieving this are now described with reference to FIG. 5 which shows, generally indicated as 110, a testing system embodying the invention.

The testing system 110 is similar to the system 10 of FIG. 1, like numerals being used to denote like parts and the same or similar description applying, as would be apparent to a skilled person, unless otherwise indicated. The testing system 110 includes a reactor 112, a control system (not shown) for controlling the operation of the reactor 112, a fluid circuit 116, a test zone 118, pumping means 120 (typically one or more fans), heating means 122 (typically a furnace), a reservoir 124 and a plurality of control zones 128. It will be understood that any of the features of the system 10 may be included in the system 110 and vice versa.

The reactor 112 includes a fluid outlet 170, for example comprising a vent, that is connected to the fluid circuit 116 by a valve 172 that is operable to open or close the outlet 170. When the outlet 170 is open fluid from the circuit 116 leaves the circuit 116 via the outlet 170, typically by evacuation. Typically the pressure differential between the circuit 116 and the open outlet is sufficient to cause fluid to be evacuated from the circuit 116 although optionally a pump may be provided to assist removal of the fluid. Preferably, the valve 172 is operable to adopt not only a fully open state and a fully closed state, but also one or more partially open states in order to control the rate at which fluid can leave the circuit 116 via the outlet 170. In preferred embodiments, the outlet 170 is located downstream of the test zone 118, preferably at the outlet of the test zone 118. In alternative embodiments (not illustrated) more than one outlet and controlling valve may be provided at any desired location(s) around the circuit 116. The outlet 170 may vent fluid to the surrounding environment or to a tank (not shown) as desired. Conveniently, the valve 172 is included in a control zone 128A. As is described in more detail below, the valve 172 may be operated to control the proportion of the exit stream from the test zone 118 that is recirculated around the circuit 116 and/or to cause quantities of fluid to be removed from the circuit 116 at desired time(s), all under the control of the control system in order to implement the test specification. In particular, the valve 172 may be operated during a test and/or between successive tests to adjust the amount of recirculation that occurs and/or to get rid of unwanted quantities of fluid. This is particularly useful for removing fluid from the circuit 116 that has a composition, temperature and/or flow rate deviating from the desired base conditions, thereby facilitating establishment of the desired base conditions at the relevant location(s) in the circuit 116.

Controlling the temperature of the fluid may be performed by controlling the operation of the furnace 122. However adjusting the temperature of the fluid in this way is relatively slow. Advantageously therefore the circuit 116 includes a first bypass circuit portion 174 which, when open, allows some or all of the fluid in the circuit 116 to bypass the furnace. Typically the circuit portion 174 extends between a location 175 in the circuit 116 before the inlet to the furnace 122 (or other heater as applicable) to a location 176 in the circuit after the outlet of the furnace 122. One or more valve 178 is provided for controlling the flow of fluid through the bypass circuit portion 174. The valve(s) are preferably operable to open the circuit portion 174 to allow some or all of the fluid in the circuit 116 to bypass the furnace 122, or to close the circuit portion 174 thereby preventing fluid from bypassing the furnace 122. Preferably, the valve 178 is operable to adopt not only a fully open state and a fully closed state, but also one or more partially open states in order to control the amount of fluid that bypasses the furnace 122. Typically any fluid that is not diverted through the bypass circuit portion 174 passes through the furnace 122. Optionally, one or more valve 179 may be provided to prevent any fluid from passing though the furnace 122, for example if it is desired that all of the fluid in the circuit 116 should bypass the furnace 122. In the illustrated embodiment, valves 178 and 179 are shown separately for illustration purposes but they may conveniently be the same valve. In any event, the or each valve 178, 179 is operated by the control system, typically being part of a control zone 28B, in order to implement the test specification. Fluid arriving at location 176 via the bypass circuit portion 174 is not heated by the furnace and so is relatively cool compared to fluid arriving at location 176 via the furnace 122. Therefore the control system is able to control (relatively quickly) the temperature of the fluid at location 176 by controlling the amount of fluid that flows though the bypass circuit portion 174. This control may be performed in conjunction with controlling the operation of the furnace 122 if required and facilitates establishment of the desired base conditions at the relevant location(s) in the circuit 116. A similar bypass circuit portion may be provided around each furnace or other heater included in the system.

Controlling the flow rate of the fluid may be performed by controlling the operation of the fan(s) 120. However adjusting the flow rate of the fluid in this way is relatively slow. Advantageously therefore the circuit 116 includes a second bypass circuit portion 180 which, when open, allows some or all of the fluid in the circuit 116 to bypass the test zone 118. Typically the circuit portion 180 extends between a location 182 in the circuit 116 before the inlet to the test zone 118 to a location 184 in the circuit 116 after the outlet of the test zone 118. One or more valve 186 is provided for controlling the flow of fluid through the bypass circuit portion 180. The valve(s) are preferably operable to open the circuit portion 180 to allow some or all of the fluid in the circuit 116 to bypass the test zone 118, or to close the circuit portion 180 thereby preventing fluid from bypassing the test zone 118. Preferably, the valve 186 is operable to adopt not only a fully open state and a fully closed state, but also one or more partially open states in order to control the amount of fluid that bypasses the test zone 118. Typically any fluid that is not diverted through the bypass circuit portion 180 passes through the test zone 118. Optionally, one or more valve 188 may be provided to prevent any fluid from passing though the test zone 118, for example if it is desired that all of the fluid in the circuit 116 should bypass the test zone 118. In the illustrated embodiment, valves 186 and 188 are shown separately for illustration purposes but they may conveniently be the same valve. In any event, the or each valve 186,188 is operated by the control system, typically being part of a control zone 28C, in order to implement the test specification. The control system is able to control (relatively quickly) the flow rate of fluid in the test zone 118 by controlling the amount of fluid that flows though the bypass circuit portion 180. This control may be performed in conjunction with controlling the operation of the fan(s) if required and facilitates establishment of the desired base conditions at the relevant location(s) in the circuit 116. A similar bypass circuit portion may be provided around any other test zone(s) in the system and/or around the fan(s) 120 or other pumping devices.

Figure 5:
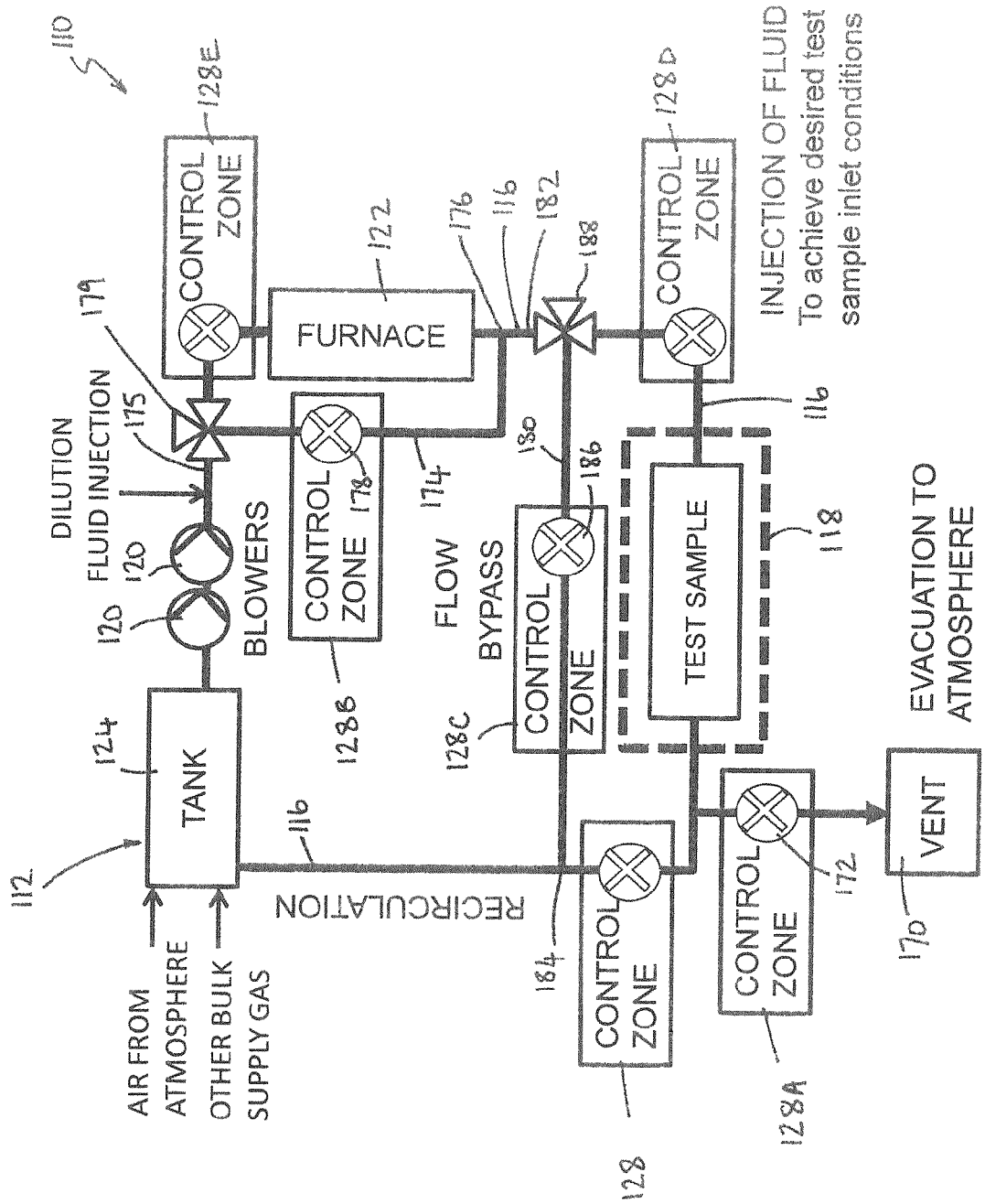
FIG. 5 is a schematic view of an alternative embodiment of the testing system.

The fluid in the circuit 116 typically comprises a base fluid to which one or more other fluids are added in accordance with the test specification. As is shown in FIG. 5, the added fluid(s), which typically comprise one or more hydrocarbon gases and/or at least one oxygen-containing gas, may be added at the inlet of the test zone 118 in order to create the required test conditions at the inlet to the test zone 118. A control zone 128D is provided at the inlet of the test zone 118 for this purpose. The base fluid comprises one or more bulk fluids that may be added to the system and into the circuit 116 at one or more locations. Typically, at least some of the bulk fluid(s) are added to the reservoir 124 from which they can be introduced into the circuit 116, typically under control of the control system using one or more valves (not shown). Alternatively, or in addition, at least some of the bulk fluid(s) may be injected into the circuit 116 at one or more other locations, for example at control zone 128E and/or at the output of the fan(s) 120. Any suitable fluid injection device (not shown) may be used for supplying fluids to the reservoir or other location in the circuit 116.

In order to help establish the base conditions in the circuit 116, quantities of any one or more of the available bulk fluids may be introduced into the circuit 116 to dilute the fluid in the circuit 116. This dilution is particularly useful for adjusting the fluid composition, e.g. reducing the amount of unwanted fluid concentrations (in comparison with the desired base conditions) that may be present in the fluid, but may also have an affect on the temperature and/or flow rate of the fluid in the circuit 116.

Any one or more of the techniques described above, i.e. controlling the amount of recirculation by controlling evacuation, temperature control by bypassing the furnace, flow control by bypassing the test zone and dilution, may be performed individually or in any combination to adjust the composition, temperature and/or flow rate of the fluid in the circuit 116. The techniques are particularly useful for making rapid adjustments to the fluid parameters in order to implement transient test conditions, e.g. by allowing desired base conditions to be established quickly. When the control system is calculating how to implement a test specification, it may use any one or more of these techniques, in any combination, and in combination with any other available control techniques. The corresponding control information generated by the control system will therefore include control information for causing the relevant system component(s), typically at the relevant control zone(s), to implement the selected control techniques in the manner required to implement the test specification. This includes, as applicable, control information for controlling the timing and degree of opening of the relevant valves, including valves 172, 178, 179, 186, 188, which may for example be rotary control valves. The relevant valves are controlled to accurately and repeatedly control the fluid in the circuit and in particular through the test sample to implement transient or static test conditions as required. As with the other control zones, there is high speed control and position measurement of the valve position at actuation point and then positional information sent back to the master controller in real time.

The composition of the base fluid depends on the test(s) being implemented. Most commonly the base fluid is gaseous, comprising one or more gases and optionally water vapour. The fluids that are added to the base fluid are typically also gaseous, most commonly comprising one or more pure hydrocarbon gases and/or at least one oxygen-containing gas. Conventionally, the base fluid comprises predominantly an inert gas such as nitrogen, often in combination with smaller concentrations of one or more other synthetic gases. This can be problematic when creating rapidly changing fluid conditions in the reactor 112 since there are limitations on the rates at which bulk supplied synthetic gases can be injected into the reactor. In addition, bulk synthetic gases are relatively expensive. To address these problems, preferred embodiments of the invention use air as a bulk gas for providing the base fluid. The proportion of the base fluid that is air depends on the test being implemented but is preferably between approximately 10% and 100%, more preferably between approximately 50% and 100%. In some embodiments the base gas is 100% air. In cases where the base gas is not 100% air, one or more other synthetic gases (e.g. nitrogen or carbon dioxide) and/or water vapour may by provided as bulk gases to make up the base gas as required.

Apart from being freely available, an advantage of using air as a significant and preferably predominant component of the base fluid is that it can be supplied to the reactor 112 and introduced into the circuit 116 relatively quickly using any suitable conventional air pump or air compressor or other fluid inlet device, conveniently from the surrounding environment. This facilitates the dilution technique described above. In preferred embodiments, air is supplied to the reservoir 124, and/or one or more other location in the circuit 116, from the surrounding environment by a compressor (not shown).

It will be apparent from the foregoing that preferred systems embodying the invention are capable of delivering precise static or transient conditions of gas concentration, flow and temperature to the test sample. In a static condition test, the flow rate of the base gas is typically constant for the during of the test. The temperature of the fluid at the inlet of the test zone may be constant or may vary between two or more set points during the test. The composition of the fluid at the test zone inlet may be constant during the test but more usually the concentrations of one or more constituent fluids changes between two or more set points. For transient test conditions each of the parameters of composition, temperature and flow can vary substantially continually throughout the test, e.g. to simulate variations in vehicle speed, acceleration and engine load.

Using predominately air as the base gas for diesel simulations in particular allows full scale replication of real world conditions without the need for excessive quantities of nitrogen or other supplied base gas.

For some tests, including exhaust gas simulations, the base gas comprises up to 21% oxygen by volume. For example for tests implementing diesel engine exhaust simulations, the base gas comprises between approximately 6% and 21% oxygen by volume using typically 25% to 100% air by volume. For tests implementing other simulations, such as gasoline engine exhaust simulations, the base gas typically comprises between 0 and 21% oxygen by volume. Advantageously therefore for many such tests, in particular tests that require between 10% and 21% oxygen by volume, air is used as the predominant component of the base gas, typically being present as between approximately 50% and 100% of the base gas by volume as required.

In preferred embodiments, the control system uses a combination of recirculation and evacuation to maintain desirable gases and expel unwanted gases (e.g. CO2 or CO in automotive related tests) in the fluid. The amount of recirculation may be between 0 and 100% depending on the test and the item being tested. For example, between 0% and 50% recirculation may be employed with a catalyst test sample or between 0% and 100% recirculation for any other test sample type. Relatively low levels of re-circulation facilitates control of aggressive transient conditions whilst recirculation reduces fluid supply requirements and maximises energy efficiency.

Optionally, systems embodying the invention may include one or more devices (not shown) for controlling the ambient conditions of the environment around the test zone 18, 118 (as distinct from the fluid conditions at the test zone to which the test sample is subjected). Such devices may include any conventional apparatus for heating or cooling the ambient environment, and/or for adjusting ambient air flow and/or ambient air pressure. This allows real world environmental conditions to be simulated around the test zone.

The preferred system therefore allows not only replication of test sample inlet test conditions but also sample exterior (ambient) test conditions, that can include external temperature control in the range of, for example, −30° C. to +50° C., simulation of varying altitude conditions by an atmospheric control chamber or similar pressure control device, for example in the range of 100% vacuum to +1000 bar, relative humidity conditions of 0% to 100% by use of a humidity chamber or other device and/or forced convection conditions replicated by using air moving device such as blowers, fans etc. Replication of thermal shocks may be achieved by provision of instant heat via chemical reaction, electric heater on the exterior of the sample. Replication of thermal shocks may also be achieved by cooling the exterior of the test sample by water splash, water spray, use of liquid nitrogen or other appropriate fluid.

Preferred embodiments facilitate real world simulations for comparative product evaluations and for compliance with global legislative test conditions, for example emissions control systems tested to EURO6c or other emissions legislation. Preferred embodiments may be used to characterize and evaluate performance of emissions measurement systems under known input test conditions. Performance evaluations carried out to a high level of precision include: repeatability; reproducibility; accuracy; stability; and resolution.

The invention is not limited to the embodiment(s) described herein but can be amended or modified without departing from the scope of the present invention.

The invention claimed is:

1. A test system comprising:
  a recirculating fluid reactor, the reactor comprising
    a recirculating fluid circuit configured to recirculate fluid within said reactor,
    a test zone configured to receive at least one item under test, said test zone being included in said recirculating fluid circuit and being configured to expose said at least one item under test to fluid flowing in said recirculating fluid circuit during use,
    a plurality of control zones included in said recirculating fluid circuit at a respective different location, each control zone including at least one control device for controlling at least one parameter of said fluid flowing in said recirculating fluid circuit in accordance with control information; and
  a control system for controlling the operation of the reactor, the control system being in communication with said control zones to provide said control zones with said control information
  and wherein said control system is configured to:
    receive input data specifying at least one test value for said at least one parameter of said fluid flowing in said recirculating fluid circuit;
    predict the behaviour, in respect of said at least one fluid parameter, of said fluid flowing in said recirculating fluid circuit using said input data and a mathematical model of the reactor, wherein said control system is configured to mathematically model said reactor using either one or both of: model predictive control (MPC) and at least one artificial neural network (ANN);
    calculate said control information based on the predicted fluid behaviour of said fluid flowing in said recirculating fluid circuit; and
    communicate said control information to at least one of said control zones, wherein for at least one of said control zones said at least one control device comprises at least one fluid injector that is operable to inject fluid into said recirculating fluid circuit, and wherein said control system is configured to cause, by said control information, said at least one fluid injector to inject fluid into said recirculating fluid circuit to manipulate at least one of: a chemical composition of the fluid flowing in said recirculating fluid circuit: and a mixture composition of the fluid flowing in said recirculating fluid circuit.

2. The system of claim 1, wherein said at least one parameter comprises a fluid composition parameter indicating the chemical composition of the fluid, a temperature parameter indicating the temperature of the fluid and a flow rate parameter indicating the flow rate of the fluid, and wherein, using said input data and said mathematical model, said control system is configured to calculate one or more effects on any one or more of the composition, temperature and flow rate of said fluid resulting from one or more combination of said at least one test value for any two or more of said fluid composition parameter, fluid temperature parameter and fluid flow rate parameter.

3. The system of claim 1, wherein said control system is configured to predict the behaviour, in respect of said at least one fluid parameter, of said fluid at one or more location in said fluid circuit using said control information and said mathematical model of the reactor, to calculate further control information based on the predicted fluid behaviour; and to communicate said further control information to at least one of said control zones.

4. The system of claim 3, wherein said control system is configured to send said further control information to one or more control zones associated with said one or more location, and to send other control information to one or more control zones associated with one or more other locations.

5. The system of claim 1, wherein at least some of said control zones includes at least one sensor for measuring one or more characteristics of said fluid at said respective location, and at least one control device for controlling one or more characteristics of said fluid in accordance with control information; and wherein said control system is configured to provide said control zones with said control information and to receive feedback information from said control zones indicative of a respective actual value for one or more of said fluid characteristics measured by said respective at least one sensor, and wherein said control system is responsive to said feedback information from one or more of said control zones to calculate at least one new set point for a least one of said control zones, and to communicate said at least one new set point to said at least one of said control zones.

6. The system of claim 1, wherein said control system is configured to calculate said control information by mathematically modelling said reactor using Model Predictive Control (MPC).

7. The system of claim 1, wherein said mathematical model comprises a neural network model and wherein said control system is configured to calculate said control information using an artificial neural network.

8. The system of claim 1, wherein said control system is configured to calculate said control information to create a desired test environment in the test zone, said test environment being defined by said at least one fluid parameter.

9. The system of claim 1, wherein said control information comprises one or more set points, each set point being indicative of a desired value for a respective one of said at least one fluid parameter, and wherein each control zone is responsive to receiving said set points to activate at least one respective control device to manipulate one or more parameters of said fluid to achieve the respective set point, and wherein, optionally, said at least one respective control device is activated to manipulate one or more fluid parameters at the respective location of the respective control zone.

10. The system of claim 1, wherein said at least one control device includes a Mass Flow Controller (MFC) for controlling the injection of said fluid by said fluid injector.

11. The system of claim 1, wherein pumping means is incorporated into said fluid circuit, said pumping means being operable to cause said fluid to circulate around said fluid circuit, and wherein said control system is configured to provide said pumping means with control information specifying at least one set point that is indicative of a desired value for a respective operating characteristic of said pumping means, said pumping means being responsive to said control information to operate or attempt to operate in accordance with said at least one set point, and wherein said control system may be configured to receive feedback information relating to the operation of said pumping means, and is responsive to said feedback information to calculate one or more new set points for said pumping means and/or for one or more of said control zones, and to communicate said one or more new set points to said pumping means or control zones respectively, wherein said feedback information is received from said pumping means and/or from one or more of said control zones.

12. The system of claim 1, wherein heating means is incorporated into said fluid circuit, said heating means being operable to heat said fluid in said fluid circuit, and wherein said control system is configured to provide said heating means with control information specifying at least one set point that is indicative of a desired value for a respective operating characteristic of said heating means, said heating means being responsive to said control information to operate or attempt to operate in accordance with said at least one set point, and wherein said control system may be configured to receive feedback information relating to the operation of said heating means, and is responsive to said feedback information to calculate one or more new set points for said heating means and/or for one or more of said control zones, and to communicate said one or more new set points to said heating means or control zones respectively and wherein said feedback information may be received from said heating means and/or from one or more of said control zones.

13. The system of claim 1, wherein at least one of said control zones is operable to manipulate the chemical composition the fluid in the fluid circuit by injecting one or more chemical reactants into said fluid circuit.

14. The system of claim 1, wherein each control zone is operable to monitor and/or control any one or more of the following system parameters: fluid flow rate; fluid flow balance; delivery of supply fluid into the fluid circuit; fluid composition; fluid temperature; fluid flow and mixture distribution, and wherein said control system may be configured to control fluid flow rate by any one or more of: (i) controlling the operation of pumping means; (ii) combining fluid flow from multiple fluid reservoirs and/or from multiple parts of the fluid circuit and/or from multiple fluid circuits; and/or (iii) controlling one or more valves,and wherein said control system may be configured to control fluid temperature by any one or more of: (i) controlling the operation of heating means; (ii) controlling the fluid composition to promote exothermic or endothermic reactions.

15. The system of claim 10, wherein said control system is configured to cause one or more of said control zones to inject one or more selected fluid into said fluid circuit at one or more locations depending on one or more detected characteristic of the fluid in the fluid circuit at said one or more locations and/or at one or more other locations in the fluid circuit, and wherein said control system is configured to inject said one or more selected fluid in accordance with a respective delivery profile calculated by said control system and specifying the quantity of the or each fluid to be injected and the timing of the injection of the or each fluid to be injected.

16. The system of claim 15, wherein said one or more fluids to be injected are selected by said control system to cause a desired chemical reaction at the, or each, injection location and/or one or more other location in the fluid circuit and/or to cause a desired change in the fluid mixture composition at the, or each, injection location and/or one or more other location in the fluid circuit.

17. A test system comprising:
a reactor, the reactor comprising
a fluid circuit,
a test zone for at least one item under test, said test zone being included in said fluid circuit to expose said at least one item to fluid flowing in said circuit during use,
at least one control zone included in said fluid circuit at a respective different location, said at least one control zone including at least one control device for controlling at least one parameter of said fluid in accordance with control information; and
a control system for controlling the operation of the reactor, the control system being in communication with said control zones to provide said control zones with said control information,
wherein said fluid circuit includes a fluid outlet, the reactor including an evacuation control zone having an evacuation control device that is operable to open or close said fluid outlet, and
wherein said control system is configured operate said evacuation control device with said control information to control evacuation of fluid from said fluid circuit.

18. The system of claim 17, wherein said control system is configured to operate said evacuation control device to adjust the amount of recirculation of said fluid in said fluid circuit.

19. The system of claim 17, wherein said control system is configured to operate said evacuation control device to remove a calculated amount of said fluid from said fluid circuit, and wherein said control system may be configured to calculate said amount depending on a determined value for any one or more of a fluid composition parameter, a fluid temperature parameter or fluid flow rate parameter of said fluid in said fluid circuit, and wherein said control system may be configured to determine the or each of said a fluid composition parameter, a fluid temperature parameter or fluid flow rate parameter in respect of a specified location in said fluid circuit and wherein said control system may be configured to control evacuation of fluid from said fluid circuit to adjust any one or more of the composition, temperature or flow rate of said fluid in said fluid circuit.

20. The system as claimed in claim 17, wherein said control system is configured to control evacuation of fluid from said fluid circuit to adjust any one or more of the composition, temperature or flow rate of said fluid in said fluid circuit.

21. The system of claim 17, wherein said fluid comprises a base fluid comprised of at least one bulk fluid, said system being connected to a source of said at least one bulk fluid by at least one fluid inlet device for introducing said at least one bulk fluid into said fluid circuit under control of said control system, wherein said at least one bulk fluid may comprise air, and wherein said base fluid may comprise between approximately 10% to 100% air by volume.

22. The system of claim 21, wherein said control system is configured to adjust any one or more of the composition, temperature or flow rate of said fluid in said fluid circuit by controlling the introduction of said at least one bulk gas into said fluid circuit to dilute the fluid in the fluid circuit.

23. The system of claim 17, wherein said fluid circuit includes heating means being operable to heat said fluid in said fluid circuit and wherein said fluid circuit includes a bypass circuit portion for diverting fluid around said heating means, and at least one valve operable to control the respective proportion of said fluid in said fluid circuit that flows through the bypass circuit portion and the heating means, and wherein said control system is configured to control the operation of said at least one valve in order to control the temperature of the fluid in said fluid circuit.

24. The system of claim 17, wherein said fluid circuit includes a bypass circuit portion for diverting fluid around said test zone, and at least one valve operable to control the respective proportion of said fluid in said fluid circuit that flows through the test zone bypass circuit portion and the test zone, and wherein said control system is configured to control the operation of said at least one valve in order to control the flow rate of the fluid at said test zone.

25. A test system comprising:
  a reactor, the reactor comprising
    a fluid circuit,
    a test zone for at least one item under test, said test zone being included in said fluid circuit to expose said at least one item to fluid flowing in said circuit during use,
    a plurality of control zones included in said fluid circuit at a respective different location, each control zone including at least one control device for controlling at least one parameter of said fluid in accordance with control information; and
  a control system for controlling the operation of the reactor, the control system being in communication with said control zones to provide said control zones with said control information,
  and wherein said control system is configured to:
    receive input data specifying at least one test value for said at least one parameter;
    predict the behaviour, in respect of said at least one fluid parameter, of said fluid using said input data and a mathematical model of the reactor, wherein said control system is configured to mathematically model said reactor using either one or both of: model predictive control (MPC) and at least one artificial neural network (ANN);
    calculate said control information based on the predicted fluid behaviour; and
    communicate said control information to at least one of said control zones,
  wherein said fluid circuit includes a fluid outlet, the reactor including an evacuation control zone having an evacuation control device that is operable to open or close said fluid outlet, and wherein said control system is configured operate said evacuation control device with said control information to control evacuation of fluid from said fluid circuit.

* * * * *